B. RANDALL.
Sulky Harrow.
No. 76,657. Patented April 14, 1868.
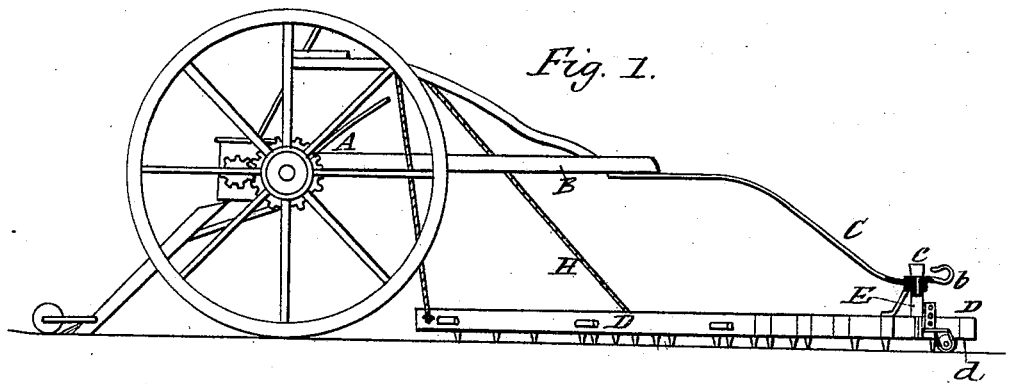
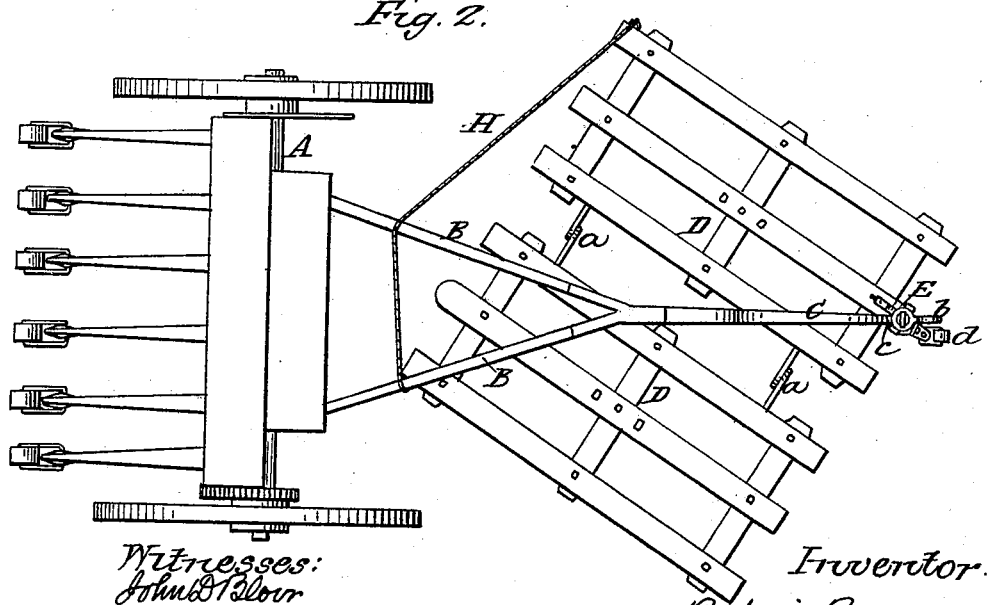

United States Patent Office.

BENJAMIN RANDALL, OF ADAMS, NEW YORK.

Letters Patent No. 76,657, dated April 14, 1868.

IMPROVEMENT IN SULKY-HARROW.

*The Schedule referred to in these Letters Patent and making part of the same.*

TO ALL WHOM IT MAY CONCERN:

Be it known that I, BENJAMIN RANDALL, of Adams, in the county of Jefferson, and State of New York, have invented a new and improved Sulky-Harrow; and I do hereby declare that the following is a full, clear, and exact description thereof, which will enable those skilled in the art to make and use the same, reference being had to the accompanying drawings, forming part of this specification.

This invention relates to a new and improved manner of combining a harrow with a sulky or riding-attachment, and is an improvement on a similar device for which Letters Patent were granted to me, bearing date 12th November, 1867.

The object of the present invention is to simplify the previously-patented machine, and, at the same time, attain all its advantages with a higher or more elevated draught, which causes the harrow to work steadier, or more evenly in contact with the ground—a very important feature in the operation of the machine.

In the accompanying sheet of drawings—

Figure 1 is a side view of my invention, a portion being in section.

Figure 2, a plan or top view of the same.

Similar letters of reference indicate corresponding parts.

A represents a sulky, which may, if desired, have a seed-distributing apparatus attached to it. B B represent the thills of the sulky, the front ends of which meet in a point, and have a curved elastic bar, C, attached to them, the shape of which is shown clearly in fig. 1.

The harrow is composed of two equal parts, D D, connected together by hinges or joints, $a\,a$. This harrow is provided with the usual or any proper teeth, and is about of square form, and has a diagonal position relatively with the sulky, as shown clearly in fig. 2.

On the front part of the harrow there is secured an upright, E, which may be constructed of metal, and has the draught-hook $b$ attached to it. The front end of the elastic bar C is also attached to the upper end of this upright, E, by a screw-bolt, $c$.

The whiffle-tree is connected to the draught-hook $b$, and it will be seen that the upright, E, gives the whiffle-tree an elevated position above the harrow, so that the front end of the latter will not be liable to be pulled up from the ground as the device is drawn along. This is an important feature of the invention, as it insures the harrow performing uniform work. The harrow, also, in consequence of having the elastic bar C resting upon its front part, is kept down, so as to effectually resist an upward movement of the harrow under the draught-movement of the machine.

An adjustable-caster wheel, $d$, is attached to the front end of the harrow, which prevents the harrow from running too deep.

This elevation of the whiffle-tree, in connection with the pressure of the sulky on the front part of the harrow, admits of the horse or a team being hitched much nearer than they otherwise could be, without pulling the harrow up from the ground, and causing the harrow to operate very imperfectly.

In the original invention, the pressure of the sulky is on a spring at the centre of the harrow, and the whiffle-tree is attached close down to the harrow, and consequently, if long traces be not employed, the harrow has a tendency to rise under the draught-movement or pull of the horse or team. This difficulty is obviated by the present invention.

Having thus fully described my invention, what I claim therein as new, and desire to secure by Letters Patent of the United States, is—

1. The connecting of the sulky to the harrow by means of an elastic bar, C, attached to the front ends of the thills B B, and to an upright, E, on the front part of the harrow, substantially as shown and described.

2. The upright, E, attached to the front end of the harrow, and having the whiffle-tree and elastic bar C connected to it, substantially as and for the purpose specified.

3. The adjustable caster $d$, attached to the front end of the harrow, when the same is constructed and arranged so as to operate substantially as described.

4. The combination of the upright, E, and draught-hook $b$, when the same are constructed and arranged so as to operate substantially as described.

5. Attaching the rope H to the harrow, substantially as and for the purpose specified.

In testimony whereof, I have signed my name to this specification in the presence of two subscribing witnesses.

B. RANDALL.

Witnesses:
    JOHN D. BLOOR,
    EDWIN JAMES.